3,177,167
QUICK-DRYING URETHANE OIL COMPOSITIONS
Gerald R. Skreckoski, Buffalo, and George S. Wooster, Hamburg, N.Y., assignors to Allied Chemical Corporation, New York, N.Y., a corporation of New York
No Drawing. Filed Mar. 19, 1959, Ser. No. 800,363
7 Claims. (Cl. 260—18)

The present invention relates to improved quick-drying protective coating compositions of the so-called "urethane oil" (isocyanate-modified drying oil) type characterized by combinations of superior properties which may be varied to suit requirements for applications extending from leather coatings to spar varnishes.

It has heretofore been proposed to prepare protective coatings using, as film-forming components, so-called "urethane oils" prepared by reacting organic diisocyanates with esterification products of glyceride drying oils containing esters of triol and drying oil acids (cf. German Patent 738,254, also O. Bayer 24 Modern Plastics, pp. 250, 252 (1947)). Varnishes prepared from such "urethane oils" were stated to be improved as to drying time and water resistance. However, they have been found wanting in many respects according to results of investigations published by E. B. Robinson and R. B. Walters (34 J. Oil and Colour Chemists Assoc., pp. 361–376, August 1951), who found that such coatings had poor durability and film stability (resistance to cracking, crazing and loss of gloss upon weathering) and for the most part poor storage stability (resistance to gelling).

It is an object of the present invention to provide varnish type protective coating compositions characterized by the following desirable properties—

(1) Very fast drying rates in air which may be controlled as desired by varying the volatility of the solvent. By use of volatile solvents such as ethyl acetate, tack-free drying times of one or two minutes are obtainable.
(2) Exceptional toughness (abrasion resistance) regardless of whether the coating is hard (mar-resistant) as required for floor and spar varnishes or less hard but very flexible as required for a leather coating.
(3) Storage stability, which for all practical purposes may be considered unlimited even though the coating is packaged as a complete or "one-can" formulation, including catalyst for accelerating the film-forming reaction. Generally, urethane based coatings lack storage stability unless the catalyst is added immediately prior to use.
(4) Good flow properties enabling the compositions to be readily applied by brushing, spraying, or dipping.
(5) Excellent adhesion to various surfaces, e.g. wood, leather, glass, steel, "Bonderite."
(6) Durability (resistance to the effects of weathering and ultraviolet light, e.g. cracking, crazing, loss of gloss) superior to that of conventional alkyd-phenolic spar varnishes.
(7) Improved resistance to alkali compared to conventional alkyd resin based coatings.

It is an object of the present invention to provide leather coatings, in either a semi-glossy finish or an often preferred flat finish, which retains the "feel" of the leather, which are quick drying, extremely flexible, strongly adhesive and so tough that the abrasion resistance of coated leather is ten times that of uncoated leather.

It is a further object of this invention to provide varnish type coating formulations suitable for floors, sheet metal, outdoor service, etc., which are quick drying, strongly adherent, tough and durable; they are harder than the leather coatings and, although less flexible, have ample flexibility for their intended uses. Such coating compositions are superior to medium oil alkyd and spar varnishes in drying time, hardness at equal levels of flexibility and abrasion resistance, and resistance to weathering and alkali. They are superior to prior art "urethane oil coatings" of the aforesaid type in that they can combine fast drying time with good adhesion, flexibility, impact resistance, film stability and resistance to weathering and alkali.

The coating compositions of the present invention comprise a film-forming component in a solvent in which may be incorporated a catalyst or "drier" to accelerate the film-forming reaction after application of the coating, and, optionally, a stabilizer to insure storage stability. The film-forming component is a reaction product of organic polyisocyanate with a reactant mixture selected from the group consisting of ester mixtures and esterpolyol mixtures, wherein the esters in said reactant mixture are predominantly partial esters of unsaturated fatty acids characteristic of glyceride drying oils, wherein said reactant mixture contains from 0.5 to 5.0, preferably from 1.5 to 3.0, free hydroxyl groups per ester linkage present, wherein from 2% to 40%, preferably from 3% to 9%, of the total of (a) the free hydroxyl, and (b) the ester groups present in said reactant mixture are groups which are bonded to structural residues of the polyether polyols having molecular weights above 500, preferably below about 5000, wherein the ratio of the number of free isocyanate groups in said organic polyisocyanate to the number of free hydroxyl groups in said reactant mixture is greater than 0.8, and wherein said reaction product of said organic polyisocyanate and said reactant mixture is substantially free from unreacted isocyanate groups.

The coating compositions of the present invention are prepared by a process which involves the following steps:

(1) An ester mixture or ester-polyol mixture is prepared by either (a) transesterifying a glyceride drying oil with polyol, or (b) directly esterifying the polyol with unsaturated fatty acid characteristic of the drying oil. All of the polyol used to prepare the esterification product may be charged prior to the esterification or transesterification reaction. Alternatively, part of the polyol is charged before the esterification or transesterification reaction and the remainder thereof is charged thereafter. The composition of the resultant ester mixture or ester-polyol mixture is such that (a) it contains from 0.5 to 5.0, and preferably from 1.5 to 3.0, free hydroxyl groups per ester linkage present, and (b) from 2% to 40%, preferably from 3% to 9%, of the total of free and esterified hydroxyl groups present are bonded to structural residues of polyether polyols having molecular weights above 500.

(2) The resulting ester mixture or ester-polyol mixture is charged with organic polyisocyanate in amount sufficient to contain at least 0.8, and preferably about 1.0, isocyanate groups per free hydroxyl group present in the ester or ester-polyol mixture. Preferably the polyisocyanate is added in increments which alternate with incremental additions of solvent which is added to maintain the fluidity required for good mixing.

(3) The remaining solvent required by the formulation is added and heating is continued until the desired viscosity is attained.

(4) If free isocyanate is present in the mixture, a stabilizer (e.g. methanol) is added. This step is not necessary if no free isocyanate is present; this condition may be attained by (a) use of an amount of polyisocyanate such as to contain not more than 1.0 isocyanate groups per hydroxyl group present in the ester mixture or esterpolyol mixture, and (b) carrying out the reaction with such completeness that all the isocyanate groups are reacted. Any isocyanate used in the present process which is much in excess of an amount containing 1.0 isocyanate groups per hydroxyl group in the ester or ester-polyol mixture, is surplusage.

(5) Catalysts or "driers" which accelerate the film-forming reaction in the applied coating are added. These catalysts also accelerate the reaction between the stabilizer and free isocyanate group.

DRYING OILS

The following drying oils are representative of those suitable as transesterification reactants or as sources of unsaturated fatty acids for the direct esterification reaction: linseed, soybean, cotton seed, China-wood, peanut, sunflower, perilla, oiticica, poppy seed, olive and tall oils, various fish oils, and dehydrated castor oils. The oils may be modified by blowing or "heat bodying."

TYPE OF POLYETHER POLYOLS

Polyether polyols having molecular weights above 500 which may be used to prepare the ester mixture or ester-polyol mixture include polyalkylene ether diols, e.g. polyethylene glycol, polypropylene glycol, polybutylene glycols, as well as polyalkylene glycols containing a mixture of alkylene (e.g. ethylene and propylene) units in the molecule. Particularly useful are polyether triols prepared by condensing ethylene oxide, or propylene oxide or mixtures of ethylene oxide and propylene oxide, with glycerine and having the structure $$\text{H}_2\text{C}-\text{O}-(\text{RO})_n\text{H}$$
$$\text{HCO}-(\text{RO})_n\text{H}$$
$$\text{H}_2\text{CO}-(\text{RO})_n\text{H}$$

wherein R represents an alkylene group and $n$ represents the number of alkylene groups per chain; all of the "R" alkylene units in the molecule are not necessarily of the same structure, e.g. some may be ethylene units and others propylene units, etc. Polyether triols of this type are marketed by Dow Chemical Co. under the following designations.

| Name: | Average molecular weight |
|---|---|
| Polyglycol 11–80 | 700±50 |
| Polyglycol 11–100 | 1030±100 |
| Polyglycol 11–200 | 2700±200 |
| Polyglycol 11–300 | 4000±350 |
| Polyglycol 11–400 | 4900±350 |
| Polyglycol 112–3 | 3000±300 |
| Polyglycol 15–100 | App. 1100 |
| Polyglycol 15–200 | App. 2600 |

Other useful polyether polyols of this general structure include polyether triols built up around a central nucleus consisting of a residue from a triol other than glycerine, e.g. trimethylol ethane, trimethylol propane, hexanetriol-1,2,6, etc., and polyether tetrols built up around a central nucleus consisting of a residue from a tetrol such as erythritol or pentaerythritol.

The other polyols entering into the composition of the ester mixture or ester-polyol mixture may include, for example, glycerine, trimethylol ethane, trimethylol propane, triethanolamine, hexanetriol-1,2,6, ethylene glycol, propylene glycol, diethylene glycol, dipropylene glycol, polyethylene and polypropylene glycols having molecular weights below 500, erythritol, pentaerythritol, sorbitol, mannitol, etc., as well as polyether polyols of the above defined types (i.e. the Dow Chemical Co. "Polyglycol" series of polyether triols) having molecular weights below 500.

PROPORTION OF POLYETHER POLYOLS

From 2% to 40% of the total number of hydroxyl groups (or hydroxyl group equivalents) of the polyols entering into the composition of the ester mixture or ester-polyol mixture should be bonded to structural residues of the polyether polyols having molecular weights above 500. By "total number of hydroxyl group equivalents entering into the compositions" of the ester or esterpolyol mixture is meant the sum of the free hydroxyl equivalents and esterified hydroxyl group equivalents present in the mixture. This number, obviously, does not change during the course of the reaction. If the mixture is prepared by direct esterification, the total number of hydroxyl group equivalents entering into its composition will be equal to the sum of the hydroxyl group equivalents of the individual components of the total polyol mixture charged to the process. If the mixture is prepared by transesterifying a mixture of polyol and natural glyceride oil, the total number of hydroxyl group equivalents entering into the composition of the mixture includes not only the sum of the hydroxyl group equivalents of the individual components of the total polyol mixture charged to the process but also the number of hydroxyl group equivalents represented by the glycerine residue contained in the molecular structure of the glyceride oil.

The number of hydroxyl group equivalents represented by a given weight of polyol components charged to the synthesis batch is given by the expression:

$$\frac{\text{Weight in grams of polyol components charged} \times \text{number of hydroxyl groups per molecule of polyol}}{\text{Molecular weight of polyol component charged}}$$

The number of hydroxyl group equipvalents represented by a given weight of glyceride oil charged to the batch is given by the expression:

$$\frac{\text{Weight in grams of glyceride component charged} \times (\text{saponification No.} - \text{acid No. of glyceride})}{56,100}$$

Usually the acid No. of the glyceride is so small that it may be neglected in making the calculation.

The proportion of polyol to unsaturated fatty acid, or glyceride thereof, used in preparation of the ester or ester-polyol mixture is such that said mixture shall contain from 0.5 to 5.0 free hydroxyl groups per ester linkage present. If the ester component is prepared by direct esterification of unsaturated fatty acids, the number of ester equivalents present in the product is given by the expression:

$$\frac{\text{Weight in grams of acids charged} \times \text{neutralization number of acids charged}}{56,100}$$

The number of free hydroxyl group equivalents present may be calculated by subtracting the number of ester group equivalents present from the number of hydroxyl group equivalents charged. If the ester component is prepared by transesterification of a natural glyceride oil, the number of ester group equivalents present is given by the expression:

$$\frac{\text{Weight in grams of glyceride charged} \times \text{saponification No. of glyceride}}{56,100}$$

In this case the number of free hydroxyl group equivalents present is equal to the number of hydroxyl group equivalents in the free polyol charged providing, as is usually the case, that the acid number of the glyceride oil is negligibly small. If this is not so, the number of hydroxyl group equivalents in the polyol charged is decreased by the number of acid equivalents in the glyceride oil charged to obtain the number of free hydroxyl group equivalents in the product. The number of acid equivalents in the glyceride oil charged is given by the expression:

$$\frac{\text{Weight in grams of glyceride charged} \times \text{acid No. of glyceride}}{56,100}$$

In a preferred method of operation a natural glyceride is transesterified with a mixture of gylcerine and polyether triol having a molecular weight above 500. If the ratio of free hydroxyl groups to ester groups in the product is 0.5, the product has an average composition corresponding to that of a triol diester. If the said ratio is 2.0, the product has an average composition corresponding to that of a triol monoester. If the said ratio exceeds 2.0, the product has an average composition corresponding to that of a mixture of a triol monoester and excess unesterified triol. In general, higher ratios of free hydroxyl groups to ester linkages favor faster drying times but also favor hardness and brittleness. However, in accordance with the present invention the incorporation of polyether polyol components having molecular weights above 500 improve flexibility and adhesion.

POLYISOCYANATES

Organic polyisocyanates suitable for making the coating compositions of the present invention include, among many others, 2,4-and 2,6-tolylene diisocyanates, para and meta phenylene diisocyanates, 1 - chlorphenylene-2,4-diisocyanate, 1,5-naphthalene diisocyanate, 3,3'-bitolylene-4,4-diisocyanate, diphenylmethane-4,4'-diisocyanate, hexamethylene diisocyanate, naphthalene triisocyanate, and triisocyanates such as are obtained by reacting 1 mol of a triol such as trimethylolpropane with 3 mols of a diisocyanate such as tolylene diisocyanate.

OTHER COMPONENTS

Solvents used in the present invention are, in general, similar to conventional lacquer solvents. The drying rate of the coating is principally determined by the evaporation rate of the solvent; the "tack-free" drying time of the solvent-free coating is only a minute or two. Suitable solvents include toluene, xylene, various petroleum hydrocarbon distillate fractions, toluene-methyl chloride mixtures, isopropyl ether, esters such as ethyl acetate, and ketones such as methylethyl ketone and cyclohexanone. Solvent used to thin the reaction medium during the addition of isocyanate should be substantially free of active hydrogen as determined by the Zerewitnoff method (cf. Kohler et al., 40 J. Am. Chem. Soc. 3181–8 (1927)). Such reactive hydrogen (i.e. the hydrogen present in hydroxyl groups) would react with the isocyanate groups present. However, any solvent added to the batch after reaction between the isocyanate and ester or ester-polyol mixture is completed may contain reactive hydrogen. Concentration ranges of 40% to 80% non-volatiles are preferred for packaging. Prior to application the concentration may be diluted to as low as 10% nonvolatiles. The more dilute solutions are better adapted for spray application in some equipment.

A stabilizer such as a simple aliphatic alcohol, particularly primary alcohols such as methanol, ethanol or butanol, may be added. The use of such stabilizers in connection with isocyanate modified alkyd resins is the subject of pending U.S. application Serial No. 635,612, Michael S. Rhodes and Richard J. Spaunburgh, inventors, filed January 23, 1957, now U.S. Patent No. 2,970,123, issued January 31, 1961.

Catalysts or "driers" used to accelerate the film-forming reaction are the same as those used in conventional varnish formulations. The naphthenates or equivalent oil-soluble salts of cobalt, lead and manganese are particularly suitable. They are conveniently added to the batch, as solutions of the metal naphthenate in mineral spirits, after all the solvent required by the formulation has been added. They may be added before or after the stabilizers.

PROCEDURE

The transesterification reaction generally involves heating the polyol-glyceride mixture at a rather high temperature (200–250° C.) for a rather long time (e.g. 2 hours) in the presence of a transesterification catalyst such as calcium naphthenate or litharge. Direct esterification may be effected by heating a mixture of polyol and unsaturated fatty acids at circa 150–200° C., suitably an inert gas such as carbon dioxide or nitrogen is bubbled through the reaction mixture to remove water substantially as rapidly as formed and also to prevent oxidative discolorations. Upon completion of the transesterification or esterification reaction the batch is preferably cooled to circa 50° C. If all the polyol was not charged prior to the ester-forming reaction, the additional polyol is charged at this point. The polyisocyanate is then added in increments during a fairly long period (e.g. ½ hour to 2 hours) during which the batch is agitated. The temperature is allowed to rise to 70–85° C. Usually the exothermic heat of reaction between the polyisocyanate and ester mixture (or ester-polyol mixture) suffices but external heating is used if needed. Further temperature increase is, preferably, prevented by cooling the reactor.

Solvent is added from time to time between the addition of polyisocyanate increments, if necessary, to maintain the fluidity required for good mixing. When the reaction between the polyisocyanate and free hydroxyl groups in the ester mixture or ester-polyol mixture is substantially complete the remaining solvent required by the formulation is added and the batch is agitated at 70° to 100° until the desired viscosity is obtained. In general viscosities of R–T on the Gardner-Holdt scale at 50% non-volatiles concentration, or equivalent viscosities at some other non-volatile concentration, are satisfactory for solvents having medium to high kauri-butanol values. Optionally, the stabilizers are then added and mixed in. Although, as aforesaid, the stabilizer is not necessary unless free isocyanate is present, it is preferred to add the stabilizer as insurance anyway. If desired the batch can be tested for free isocyanate by a procedure described on page 99 of an article by Siefken in volume 562 of Annalen der Chemie (1949). Finally the film-forming catalysts or "driers" are added.

The coatings may be stored indefinitely without "gelling." This results from the absence of free isocyanate groups.

The coatings may be applied by brushing, dipping or spraying. Spraying is preferred for leather coatings. For spray applications it is usually desirable to thin the coating with a suitable solvent, e.g. ethyl acetate or mixtures thereof with hexane, xylene, etc.

The film-forming reaction in the applied coating is like that of a conventional varnish in that it involves crosslinking between the unsaturated fatty acid residues and is unlike that of various other urethane coating formulations in that it does not involve reactions of isocyanate groups.

The following examples describe the preparation and properties of coating compositions representative of the present invention. In the examples the term "equivalents" applied to a polyol means $$\frac{\text{Weight in grams charged} \times \text{No. of hydroxyl groups per molecule}}{\text{molecular weight}}$$

Applied to a glyceride, it means $$\frac{\text{Weight in grams charged} \times \text{saponification number}}{56,100}$$

The number of equivalents represented by the glyceride is here equal to the number of equivalents of ester groups or of hydroxyl group residues contained therein, because the acid numbers of the glycerides used were negligibly small.

Example 1

This example describes the preparation and properties of a leather coating.

PART A.—PREPARATION

The soybean oil used was an alkali refined commercial product having a saponification number of 192 and equivalent weight of 292. The acid number was negligibly small.

The "Polyglycol 15–100" used, a product of Dow Chemical Co., is a polyether triol of average molecular weight about 1100 prepared by condensing one equivalent of glycerine with a mixture of ethylene and propylene oxides. It has the following structure:

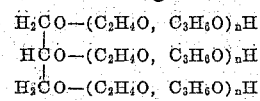

*n* represents the number of alkylene groups per chain.

The "Polyglycol 112–3" used, also a product of Dow Chemical Co., was a polyalkylene (predominantly polypropylene) ether triol having a structure similar to that given above and an average molecular weight of about 3300, wherein all the terminal hydroxyl groups are primary hydroxyl groups.

The m-tolylene diisocyanate used was a liquid mixture containing about 20% of the 2,6-isomer and 80% of the 2,4-isomer.

The calcium naphthenate, lead naphthenate and cobalt naphthenate used where added as solutions in mineral spirits containing, respectively, 4% calcium, 6% cobalt and 24% lead.

A mixture of soybean oil (417 parts=1.43 equivalents), glycerine (74 parts=2.4 equivalents) and "Polyglycol 15–100" (65 parts=0.18 equivalent) and calcium naphthenate solution containing 4% Ca (1.7 parts) was agitated and heated at 250° C. for two hours under an atmosphere of nitrogen. Th resulting transesterification product was cooled to 50° C. and charged successively with "Polyglycol 112–3" (105 parts=0.09 equivalent) and dipropylene glycol (45 parts=0.67 equivalent). Tolylene diisocyanate (294 parts=3.38 equivalents) was then added during a ½ hour period in which the temperature was allowed to rise (from exothermic heat of reaction) to 70° C., whereat it was held by cooling. During the addition of the tolylene diisocyanate, ethyl acetate was added as needed to maintain the fluidity required for good mixing. The batch was then agitated at 70–80° C., while enough additional ethyl acetate was added to make the total amount 1000 parts (=50% by weight of the batch at this point). Heating at 70–80° C. was continued until the viscosity rose to a value of R–T on the Gardner-Holdt scale. Methanol (50 parts=1.57 equivalents) was then added. The batch was then cooled and charged with 20 parts of lead naphthenate solution (24% lead) and 8.3 parts of cobalt naphthenate solution (6% Co).

PART B.—PROPERTIES OF COATING

The coating composition thus obtained was thinned with 1.5 parts per part coating of 60:40 ethyl acetate-hexane mixture and sprayed on leather. The film of coating had a tack-free drying time of two minutes. The test used involved pressing loose cotton fiber (surgical cotton) against the coated surface; the surface is considered "tack-free" if none of the fibers stick thereto.

The coating was glossy and so flexible that the leather was not appreciably stiffened and could be flexed at will without cracking the coating.

For some purposes a "flat" finish retaining the "feel" of the leather is preferred to a glossy finish. This was obtained by pressing the coated surface of a sample of the leather against an unpolished platen at 90° C. and 125 p.s.i. This treatment, if desired, should preferably be done within a few hours of application of the coating.

The abrasion resistance of samples of coated and uncoated leather was compared using a Taber Abrader. This instrument is described on page 185 of "Physical and Chemical Examination: Paints, Varnishes, Lacquers, Color" by H. A. Gardner and G. C. Sward, Bethesda, Md., 11th ed. (1950). A CS–10 abrading wheel was used for 1000 revolutions under a 2000 gram loading. The weight loss was 90 milligrams in the case of the uncoated leather and 9 milligrams in the case of the coated leather. Thus the coating improved the abrasion resistance of the leather by a factor of about ten-fold.

The following examples describe the preparation of coatings suitable for uses similar to those of floor varnishes and spar varnishes. Data on the properties of these coatings are included in Table I.

Example 2

Materials used to prepare the coating composition described in this example were as described in Example 1.

A mixture of soybean oil (532 parts=1.82 equivalents), glycerine (93 parts=3.0 equivalents) and "Polyglycol 15–100" (83 parts=0.22 equivalent) was agitated and heated at 250° C. for two hours under an atmosphere of nitrogen. The resulting transesterification product was cooled to 50° C. and charged with tolylene diisocyanate (292 parts=3.36 equivalents) during a 40-minute period in which the temperature was allowed to rise to 70° C., whereat it was held by cooling. During the addition of tolylene diisocyanate, xylene was also added from time to time as needed to maintain the fluidity required for good mixing. The batch was then agitated at 80–90° C. while enough additional xylene was added to make the total amount 1000 parts (=50% by weight of the batch at this point). Heating at 80–90° C. was continued until the viscosity rose to a value of R–T on the Gardner-Holdt scale. Methanol (50 parts=1.57 equivalents) was then added. The batch was then cooled and charged with 20 parts of lead naphthenate solution (24% Pb) and 8.3 parts of cobalt naphthenate solution (6% Co).

Example 3

A coating composition was prepared substantially exactly as described in Example 2 except that linseed oil was substituted for soybean oil. The saponification number (192) and equivalent weight (292) of the linseed oil was the same as for the soybean oil, the acid number was negligibly small.

Example 4

Materials used for this example were the same as for Example 2 except that litharge was used as a transesterification catalyst instead of calcium naphthenate solution. The procedure differs from that of Example 2 principally in that the "Polyglycol 15–100" is added after, rather than before, transesterification.

A mixture of soybean oil (315 parts=1.1 equivalents), glycerine (61 parts=2.0 equivalents) and litharge (0.03 part) was agitated and heated at 250° C. for two hours under an atmosphere of nitrogen. The resulting transesterification product was cooled to 50° C. and charged with "Polyglycol 15–100" (66 parts=0.18 equivalent). Tolylene diisocyanate (190 parts=2.2 equivalents) was added during a 35-minute period in which the temperature was allowed to rise to 80° C. Xylene was also added from time to time as needed to maintain the fluidity required for good mixing. Heating at 80° was continued for 4½ hours, xylene being added as required. Viscosity rose to Z–6 on the Gardner-Holdt scale at 60% non-volatiles content; this is equivalent to a reading of R–T at 50% non-volatiles content. The batch was cooled to 50° C. and charged with methanol (20 parts=0.63 equivalent), additional xylene sufficient to make 631 parts (=50 wt. percent of the batch) and cobalt and lead naphthenate solutions containing respectively, 6 parts by weight of lead and 0.6 part by weight of cobalt.

Table I sets forth data on the compositions of the film-forming components of the coating compositions described in Examples 1–4 and the properties of the applied coatings obtained therefrom and from a conventional prior art medium oil alkyd varnish.

The tests used to obtain the data on tack-free drying time and abrasion resistance reported in Table I are described in Part B of Example 1.

The Sward hardness tests were made by the rocking device and procedure described on pages 164–6 of the Gardner-Sward reference cited in Example 1, Part B. The data are based on a hardness scale wherein the hardness of a polished glass surface has an assigned value of 100.

The flexibility test (⅛″ mandrel) was carried out by bending a metal panel, coated with a dry film from the sample composition, around a frustoconical mandrel 8″ long, 1½″ in diameter at the base and ⅛″ in diameter at the apex. Apparatus and test procedure are described on page 172 of the Gardner-Sward reference cited above. For a coating to pass this test, the film must not crack or rupture as a result of the bending. Coatings passing this test have ample flexibility for sheet metal applications and the like but do not necessarily have adequate flexibility for a leather coating. A coating composition is adequately flexible for leather if it does not impart appreciable stiffness to the leather and does not crack when the leather is flexed at will.

The caustic-resistance tests were carried out by immersing spray coated steel panels in 5% caustic solution and observing the film periodically. The film was adjudged to have failed when it could be rubbed off by finger action.

The durability tests were made by observing the effects on the film of prolonged (1000 hours) exposure of spray coated steel panels to the action of intense ultraviolet radiation and water spray in a "Weatherometer."

The adhesion tests were made by scraping spray coated steel panels with a knife blade.

isocyanate to the number of free hydroxyl groups in said reactant mixture is greater than 0.8, and wherein the reaction product of said organic polyisocyanate and said reactant mixture is substantially free from unreacted isocyanate groups.

2. A composition adapted for quick-drying protective coatings comprising a film-forming component in an inert volatile solvent wherein the film-forming component is a reaction product of organic polyisocyanate with a reactant mixture containing esters of drying oil fatty acids, wherein the esters in said reactant mixture are predominantly partial esters of unsaturated fatty acids derived from glyceride drying oils, wherein said reactant mixture contains from 1.5 to 3.0 free hydroxyl groups per ester linkage present, wherein from 3% to 9% of the total of (a) the free hydroxyl and (b) the ester groups present in said reactant mixture are groups bonded to structural residues of polyether polyols having molecular weights from 500 to 5000, said polyether polyols being a condensation product of a member selected from the group consisting of ethylene oxide and propylene oxide with a polyhydroxy organic compound, wherein the ratio of the number of free isocyanate groups in said organic polyisocyanate to the number of free hydroxyl groups in said reactant mixture is greater than 0.8, and wherein the reaction product of said organic polyisocyanate and said reactant mixture is substantially free from unreacted isocyanate groups.

TABLE I.—COMPOSITIONS AND PROPERTIES OF COATING COMPOSITIONS DESCRIBED IN EXAMPLES 1-4 AND MEDIUM OIL ALKYD VARNISH

| Example | 1 | 2 | 3 | 4 | Medium Oil Alkyd Varnish |
|---|---|---|---|---|---|
| Composition of Film Former: | | | | | |
| "Polyol Factor" [1]— | | | | | |
| Before Transesterification | 4.4 | 4.4 | 4.4 | 0 | |
| After Transesterification | 5.6 | 4.4 | 4.4 | 5.0 | |
| Free OH-Ester Group Ratio— | | | | | |
| Before Transesterification | 1.80 | 1.8 | 1.8 | 1.82 | |
| After Transesterification | 2.34 | 1.8 | 1.8 | 1.96 | |
| NCO—OH Ratio | 1.01 | 1.05 | 1.05 | 1.02 | |
| Properties of Coating: | | | | | |
| Drytime Tack-free, minutes | 2 | 15-30 | 15-30 | 10 | 180 |
| Sward Hardness, after 24 hours | | 27 | 26 | 22 | 6 |
| Sward Hardness, after 1 week | | 38 | 46 | 32 | 22 |
| Flexibility, ⅛″ Mandrel | Pass | Pass | Pass | Pass | Pass |
| Flexibility, adequate for leather | Yes | No | No | No | No |
| Resistance to 5% caustic Time to fail, minutes | | 45-60 | 45-60 | 60-90 | 5 |
| Abrasion loss, Mg.[2] | 9 | 41 | 47 | | 55 |
| Durability, 1,000 hours in "Weatherometer" | | | OK | | Disintegrated |
| Adhesion | Good | Good | Good | Good | Good |

[1] The "polyol factor" is that percent (hydroxyl equivalent basis) of the total polyol entering into the composition of the film-former represented by polyether polyols having a molecular weight above 500; otherwise expressed it is the percent of the total free and esterified hydroxyl groups present which are bonded to structural residues of such polyether polyols.
[2] After 1000 cycles on Taber Abrader. In Example 1 a CS-10 wheel was used at a 2000 gram load. In the other examples, a CS-17 wheel was used at 1000 grams load; test conditions were less severe.

We claim:

1. A composition adapted for quick-drying protective coatings comprising a film-forming component in an inert volatile solvent wherein the film-forming component is a reaction product of organic polyisocyanate with a reactant mixture containing esters of drying oil fatty acids, wherein the esters in said reactant mixture are predominantly partial esters of unsaturated fatty acids derived from glyceride drying oils, wherein said reactant mixture contains from 0.5 to 5.0 free hydroxyl groups per ester linkage present, wherein from 2% to 40% of the total of (a) the free hydroxyl and (b) the ester groups present in said reactant mixture are groups bonded to structural residues of polyether polyols having molecular weights above 500, said polyether polyols being a condensating product of a member selected from the group consisting of ethylene oxide and propylene oxide with a polyhydroxy organic compound, wherein the ratio of the number of free isocyanate groups in said organic poly- 3. A composition adapted for quick-drying protective coatings comprising a film-forming component in an inert volatile solvent wherein the film-forming component is a reaction product of organic polyisocyanate with a reactant mixture containing esters of drying oil fatty acids, wherein the esters in said reactant mixture are predominantly partial esters of unsaturated fatty acids derived from glyceride drying oils, wherein said reactant mixture contains from 0.5 to 5.0 free hydroxyl groups per ester linkage present, wherein from 2% to 40% of the total of (a) the free hydroxyl and (b) the ester groups present in said reactant mixture are groups bonded to structural residues of polyether polyols having molecular weights above 500, said polyether polyols being a condensation product of a member selected from the group consisting of ethylene oxide and propylene oxide with a polyhydroxy organic compound, wherein the ratio of the number of free isocyanate groups in said organic polyisocyanate to the number of free hydroxyl groups in said reactant mixture is greater than 0.8, wherein the reaction product of said organic polyisocyanate and said reactant mixture is substantially free from unreacted isocyanate groups, a drier to accelerate the film-forming reaction after application of the composition as a coating, and an aliphatic alcohol to insure storage stability of the composition.

4. A composition adapted for quick-drying protective coatings comprising a film-forming component in an inert volatile solvent wherein the film-forming component is a reaction product of organic polyisocyanate with a reactant mixture containing esters of drying oil fatty acids prepared by transesterifying a glyceride drying oil with a polyhydroxy organic compound, wherein the esters in said reactant mixture are predominantly partial esters of unsaturated fatty acids derived from glyceride drying oils, wherein said reactant mixture contains from 1.5 to 3.0 free hydroxyl groups per ester linkage present, wherein from 3% to 9% of the total of (a) the free hydroxyl and (b) the ester groups present in said reactant mixture are groups bonded to structural residues of polyether polyols having molecular weights from 500 to 5000, said polyether polyols being a condensation product of a member selected from the group consisting of ethylene oxide and propylene oxide with a polyhydroxy organic compound, wherein the ratio of the number of free isocyanate groups in said organic polyisocyanate to the number of free hydroxyl groups in said reactant mixture is greater than 0.8, and wherein the reaction product of said organic polyisocyanate and said reactant mixture is substantially free from unreacted isocyanate groups.

5. A composition adapted for quick-drying protective coatings comprising a film-forming component in an inert volatile solvent wherein the film-forming component is a reaction product of organic polyisocyanate with a reactant mixture containing esters of drying oil fatty acids prepared by directly esterifying a polyhydroxy organic compound with unsaturated fatty acid derived from drying oil wherein the esters in said mixture are predominantly partial esters of unsaturated fatty acids derived from glyceride drying oils, wherein said reactant mixture contains from 1.5 to 3.0 free hydroxyl groups per ester linkage present, wherein from 3% to 9% of the total of (a) the free hydroxyl and (b) the ester groups present in said reactant mixture are groups bonded to structural residues of polyether polyols having molecular weights from 500 to 5000, said polyether polyols being a condensation product of a member selected from the group consisting of ethylene oxide and propylene oxide with a polyhydroxy organic compound, wherein the ratio of the number of free isocyanate groups in said organic polyisocyanate to the number of free hydroxyl groups in said reactant mixture is greater than 0.8, and wherein the reaction product of said organic polyisocyanate and said reactant mixture is substantially free from unreacted isocyanate groups.

6. A composition as claimed in claim 4 wherein the drying oil is soy bean oil, the polyether polyol is a polyether triol containing alkylene groups having 2-3 carbon atoms and wherein the organic polyisocyanate is tolylene diisocyanate.

7. A composition as claimed in claim 4 wherein the drying oil is linseed oil, the polyether polyol is a polyether triol containing alkylene groups having 2-3 carbon atoms and wherein the organic polyisocyanate is tolylene diisocyanate.

References Cited by the Examiner

UNITED STATES PATENTS

| | | | |
|---|---|---|---|
| 2,358,475 | 9/44 | Pratt et al. | 260—18 |
| 2,731,444 | 1/56 | Greenlee | 260—18 |
| 2,812,337 | 11/57 | Culemeyer | 260—18 |
| 2,968,575 | 1/61 | Mallonee | 260—18 |

FOREIGN PATENTS 402,308  2/43  Italy.

WILLIAM H. SHORT, *Primary Examiner.*

A. D. SULLIVAN, A. M. BOTTEHER, MILTON STERMAN, LEON J. BERCOVITZ, *Examiners.*